(12) United States Patent
Su et al.

(10) Patent No.: US 7,252,884 B2
(45) Date of Patent: Aug. 7, 2007

(54) CARBON NANOTUBE REINFORCED POROUS CARBON HAVING THREE-DIMENSIONALLY ORDERED POROSITY AND METHOD OF FABRICATING SAME

(75) Inventors: Ji Su, Yorktown, VA (US); Ngan Fong Huang, Berkeley, CA (US)

(73) Assignee: United States of America as represented by the Administrator of the National Aeronautics and Space Administration, Washington, DC (US)

( * ) Notice: Subject to any disclaimer, the term of this patent is extended or adjusted under 35 U.S.C. 154(b) by 44 days.

(21) Appl. No.: 11/190,212

(22) Filed: Jul. 25, 2005

(65) Prior Publication Data

US 2007/0020458 A1   Jan. 25, 2007

(51) Int. Cl.
 *B32B 9/00* (2006.01)
(52) U.S. Cl. .................................... 428/408
(58) Field of Classification Search ............. 428/408, 428/323; 977/DIG. 1; 423/445 R; 502/416, 502/417; 204/283, 294
See application file for complete search history.

(56) References Cited

U.S. PATENT DOCUMENTS

| | | | |
|---|---|---|---|
| 4,231,979 A | 11/1980 | White et al. | |
| 5,094,906 A | 3/1992 | Witzke et al. | |
| 5,188,776 A | 2/1993 | Witzke et al. | |
| 5,552,008 A | 9/1996 | Hecht et al. | |
| 5,691,054 A | 11/1997 | Tennent et al. | |
| 5,750,058 A | 5/1998 | Hecht et al. | |
| 5,968,650 A | 10/1999 | Tennent et al. | |
| 5,985,112 A * | 11/1999 | Fischer ........................ 204/283 |
| 6,113,722 A | 9/2000 | Hoffman et al. | |
| 6,113,819 A | 9/2000 | Tennent et al. | |
| 6,261,469 B1 | 7/2001 | Zakhidov et al. | |
| 2001/0019037 A1 | 9/2001 | Zakhidov et al. | |

OTHER PUBLICATIONS

Nonlinear transmission properties of nanostructures with single-wall carbon nanotubes and conductive polymers Han et al , Jan. 27, 2005, Applied Physics Letters; 86; 053113.*

* cited by examiner

*Primary Examiner*—Jennifer McNeil
*Assistant Examiner*—Daniel Miller
(74) *Attorney, Agent, or Firm*—Robin W. Edwards

(57) ABSTRACT

A solid carbon has CNTs dispersed therein and is formed about three-dimensionally ordered spherical voids arranged in an opal-like lattice.

11 Claims, 8 Drawing Sheets

US 7,252,884 B2

CARBON NANOTUBE REINFORCED POROUS CARBON HAVING THREE-DIMENSIONALLY ORDERED POROSITY AND METHOD OF FABRICATING SAME

ORIGIN OF THE INVENTION

The invention described herein was made in part by an employee of the United States Government and may be manufactured and used by or for the Government of the United States of America for governmental purposes without the payment of any royalties thereon or therefor.

BACKGROUND OF THE INVENTION

1. Field of the Invention

This invention relates to porous carbon. More specifically, the invention is a porous carbon having three-dimensionally ordered porosity and carbon nanotube reinforcement, as well as a method of fabricating same.

2. Description of the Related Art

Porous carbon is being considered for use in a variety of applications to include electrochemical energy storage devices, thermal dispersion devices, and electric charge dispersion devices. For example, in terms of electrochemical energy storage devices, porous carbon may provide the requisite storage capacity for hydrogen when hydrogen is to be used as an energy carrier in high-energy density rechargeable batteries or hydrogen-oxygen fuel cells. In particular, micro-porous carbon foams are promising candidates for the hydrogen storage objective since porous carbon foam presents a large surface area for hydrogen absorption. However, porous carbon foams are mechanically weak. Further, the non-uniform nature of the porosity of these carbon foams is a drawback for applications requiring precise porosity control.

The non-uniform porosity problem is addressed in U.S. Pat. No. 6,261,469 where glassy porous carbon structures are constructed by providing an opal-like lattice structure of silicon dioxide spheres, infiltrating a carbon precursor into the lattice structure, carbonizing the carbon precursor, and then dissolving the silicon dioxide spheres. However, the resulting porous structure is mechanically weak.

SUMMARY OF THE INVENTION

Accordingly, it is an object of the present invention to provide a porous carbon structure having good mechanical strength.

Another object of the present invention is to provide a porous carbon structure having uniform porosity.

Still another object of the present invention is to provide a method of fabricating a porous carbon structure that will have both good mechanical strength and uniform porosity.

Other objects and advantages of the present invention will become more obvious hereinafter in the specification and drawings.

In accordance with the present invention, a method of fabricating a three-dimensional structure utilizes a template made from spheres arranged and coupled together to form an opal-like lattice having volumetric spaces formed between the spheres. The volumetric spaces are filled with a cured form of a carbon yield material having carbon nanotubes (CNTs) dispersed therein. The carbon yield material is then carbonized and the spheres are eradicated, leaving behind spherical voids. As a result, the three-dimensional structure comprises solid carbon having CNTs dispersed therein. The solid carbon with CNTs dispersed therein is thus formed about three-dimensionally ordered spherical voids arranged in the opal-like lattice.

DETAILED DESCRIPTION OF THE INVENTION

Figure 1A:
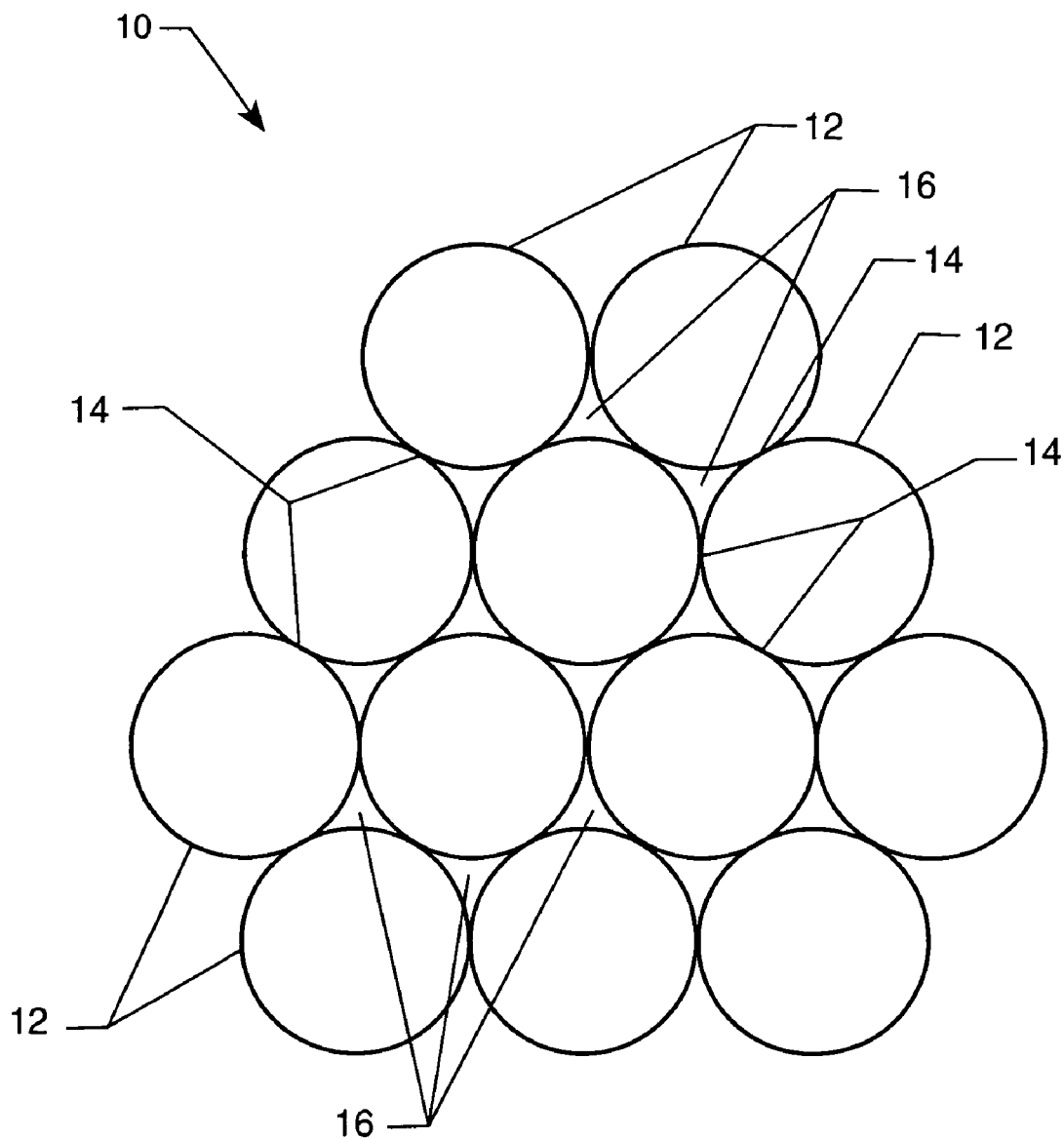
FIGS. 1A-1H depict a schematic view of the process used to fabricate a carbon nanotube reinforced porous carbon in accordance with the present invention.

The present invention advances the state-of-the-art of porous carbon materials by providing a finished porous carbon product that has both good mechanical strength and uniform porosity in the sub-micro or nano scale, and further provides a method for fabricating the porous carbon product. The finished porous carbon product could be utilized in a variety of technologies to include, for example, energy storage, fuel cells, electrochemical devices, thermal dispersion devices, electric charge dispersion devices, and filtration systems.

Referring now to the drawings, the multi-step process for fabricating the present invention's porous carbon product is illustrated schematically in FIGS. 1A-1H. The process utilizes a template 10 (shown in a microscopic schematic form) comprised of a three-dimensionally ordered arrangement of spheres 12 (e.g., solid or hollow silicon dioxide spheres) arranged and coupled to one another in an opal-like lattice structure. That is, spheres 12 are packed together to form a structure that is similar to that found in a natural opal gem. Accordingly, spheres 12 are arranged in a three-dimensionally ordered, face-centered cubic structure. Each of spheres 12 is partially joined together with adjacent ones of spheres 12 at what are known as necking connections 14 with resulting voids between spheres 12 being designated by reference numeral 16. Spheres 12 are sized to be in the sub-micro or nano scale with each of spheres 12 typically being approximately the same size. Fabrication of such a template is described in detail in U.S. Pat. No. 6,261,469, the content of which is hereby incorporated by reference. As used herein, "sphere" means spherical or approximately spherical in shape.

As a first step in the present invention's fabrication process, voids 16 must be infiltrated with a mixture that will ultimately become the reinforced solid carbon element of the finished product. The mixture is a liquefied solution of a solvent, a "carbon yield material," and carbon nanotubes (CNTs) which can be single or multi-wall CNTs. Note that when the CNTs must infiltrate small voids 16, single-wall CNTs may be preferred as they are more flexible than multi-wall CNTs. The improved flexibility allows the single-wall CNTs to more easily infiltrate the entirety of template 10.

The carbon yield material is any material that converts at least partially to solid carbon after undergoing a conventional carbonization process. It is to be understood that the choice of carbon yield material can be selected to suit a particular application and is not a limitation of the present invention as different carbon yield materials have different carbon yields upon carbonization. Typical carbon yield materials include a variety of polymers such as polyimides, mixtures of organic compounds known as pitch, polyacrynitrile, and cellulose with sulfuric acid impregnation, just to name a few. However, non-polymers such as oligomers as well as some organic non-polymer compounds could also be used without departing from the scope of the present invention.

The solvent used can be any inert solvent that can later be removed (e.g., evaporated) so that only the carbon yield material and CNTs remain in mixture. Such solvents are well known in the art.

The inclusion of CNTs in the above-described liquefied mixture is an important element in the reinforced finished porous carbon product of the present invention. It is important for the CNTs to be dispersed in the finished porous carbon product. Thus, it is also important for the CNTs to be dispersed in the liquefied mixture used to infiltrate and fill voids 16. To prevent the CNTs from clumping when making the liquefied mixture, it may be desirable to prepare "pre-mixtures" of (i) the solvent and carbon yield material, and (ii) the solvent and the CNTs. The two pre-mixtures can then be combined to form the solvent/carbon yield material/CNTs liquefied mixture. The two pre-mixtures can be made and mixed together while being heated in order to lower the mixtures' viscosities and thereby improve the liquefied mixture formation process. To keep the CNTs dispersed in the liquefied mixture during the infiltration process, the liquefied mixture must be kept dynamic.

Figure 1B:
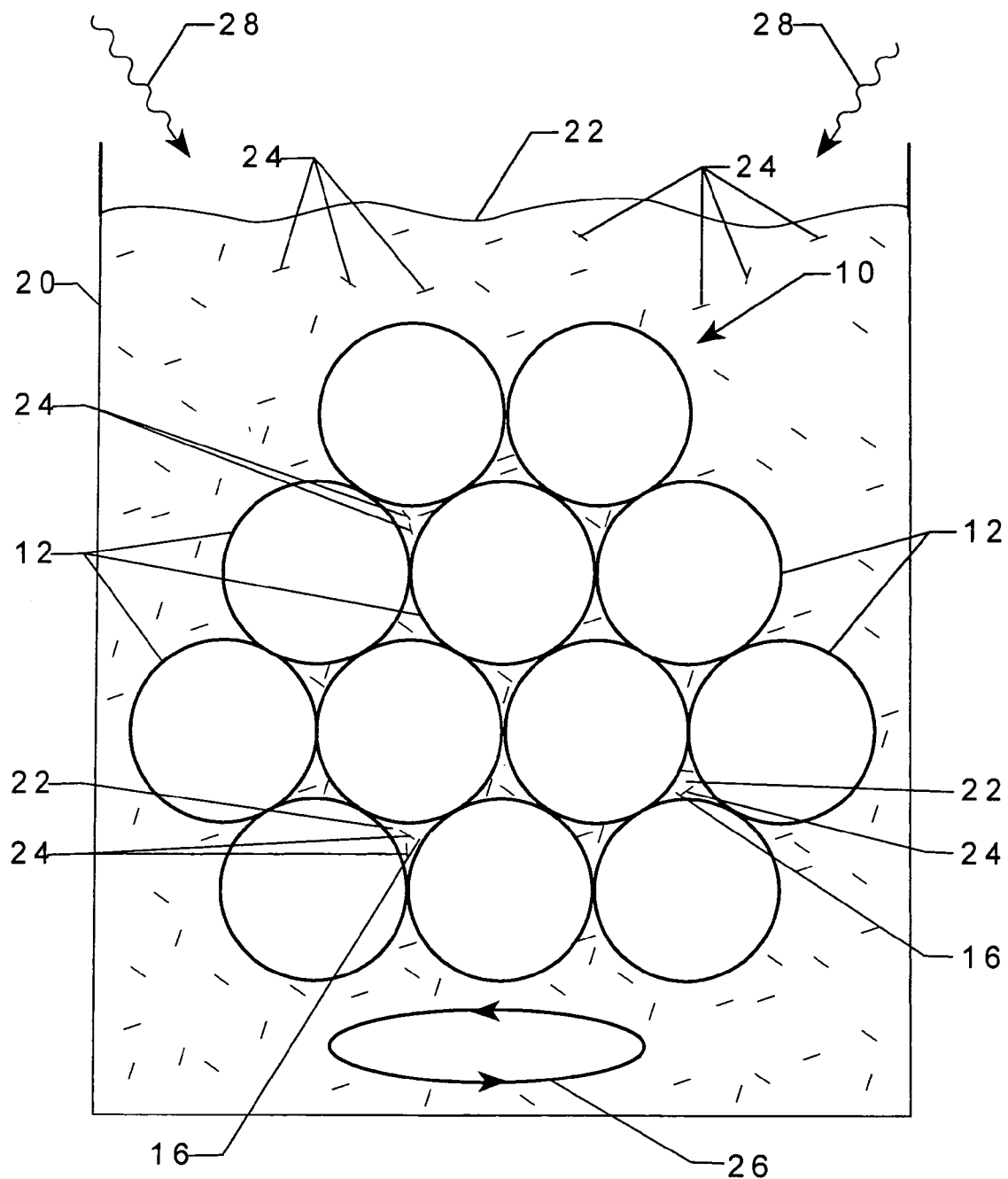
Figure 1C:
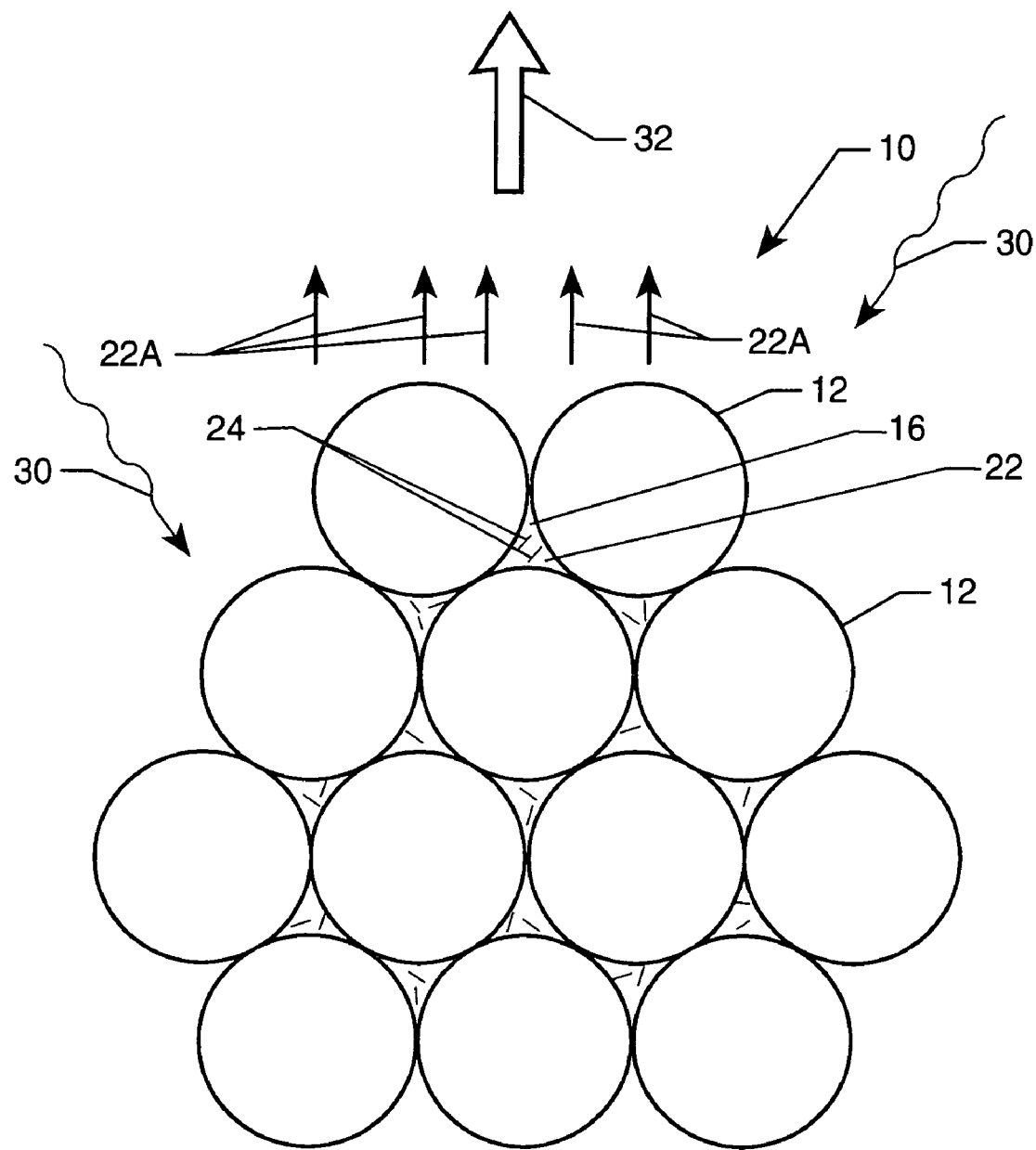

One way of keeping CNTs dispersed during the infiltration process is illustrated schematically in FIG. 1B, where a tank 20 containing the above-described liquefied mixture is contained therein and is referenced by numeral 22. CNTs 24, which are part of mixture 22, are kept dispersed therein by making mixture 22 dynamic. For example, a mixer (represented schematically by circular arrow 26) provided in tank 20 can be used to continuously move/mix mixture 22 in tank 20. Simultaneously, ultrasonic energy can be applied to mixture 22 as represented by wavy arrows 28. A variety of well known mixing and ultrasonic apparatus could be used to achieve such a dynamic immersion bath without departing from the scope of the present invention.

While mixture 22 is kept in its dynamic state, template 10 is immersed therein for a period of time sufficient to permit infiltration of mixture 22 into voids 16. The amount of time needed for infiltration will vary depending on the viscosity of mixture 22, the size of spheres 12 which determines the size of voids 16, etc.

Figure 1D:
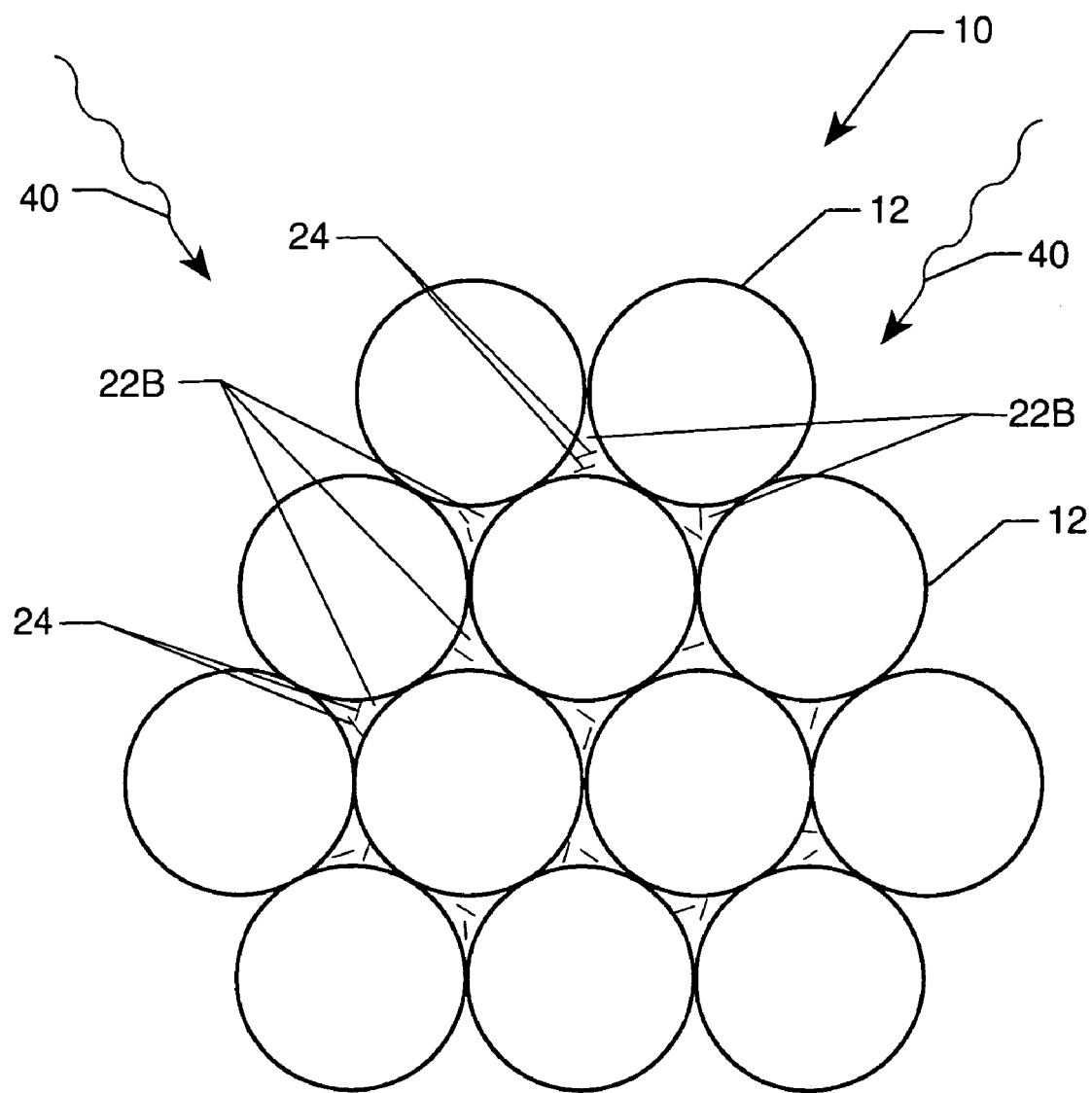

The next step in the process of the present invention involves removing the above-described solvent from mixture 22 that has infiltrated template 10 and filled voids 16. One way of implementing this step is illustrated schematically in FIG. 1C where template 10 infiltrated by mixture 22 to include dispersed CNTs 24 is illustrated. A combination of heat energy (represented by wavy arrows 30) and vacuum (represented by arrow 32) can be used to facilitate evaporation of the solvent (represented by arrows 22A). As a result of such solvent evaporation processing, template 10 remains infiltrated with a solidified form 22B of the carbon yield material with CNTs 24 dispersed therein as illustrated in FIG. 1D. Carbon yield material 22B is then cured, for example, by application of sufficient heat energy as represented by wavy arrows 40.

Figure 1E:
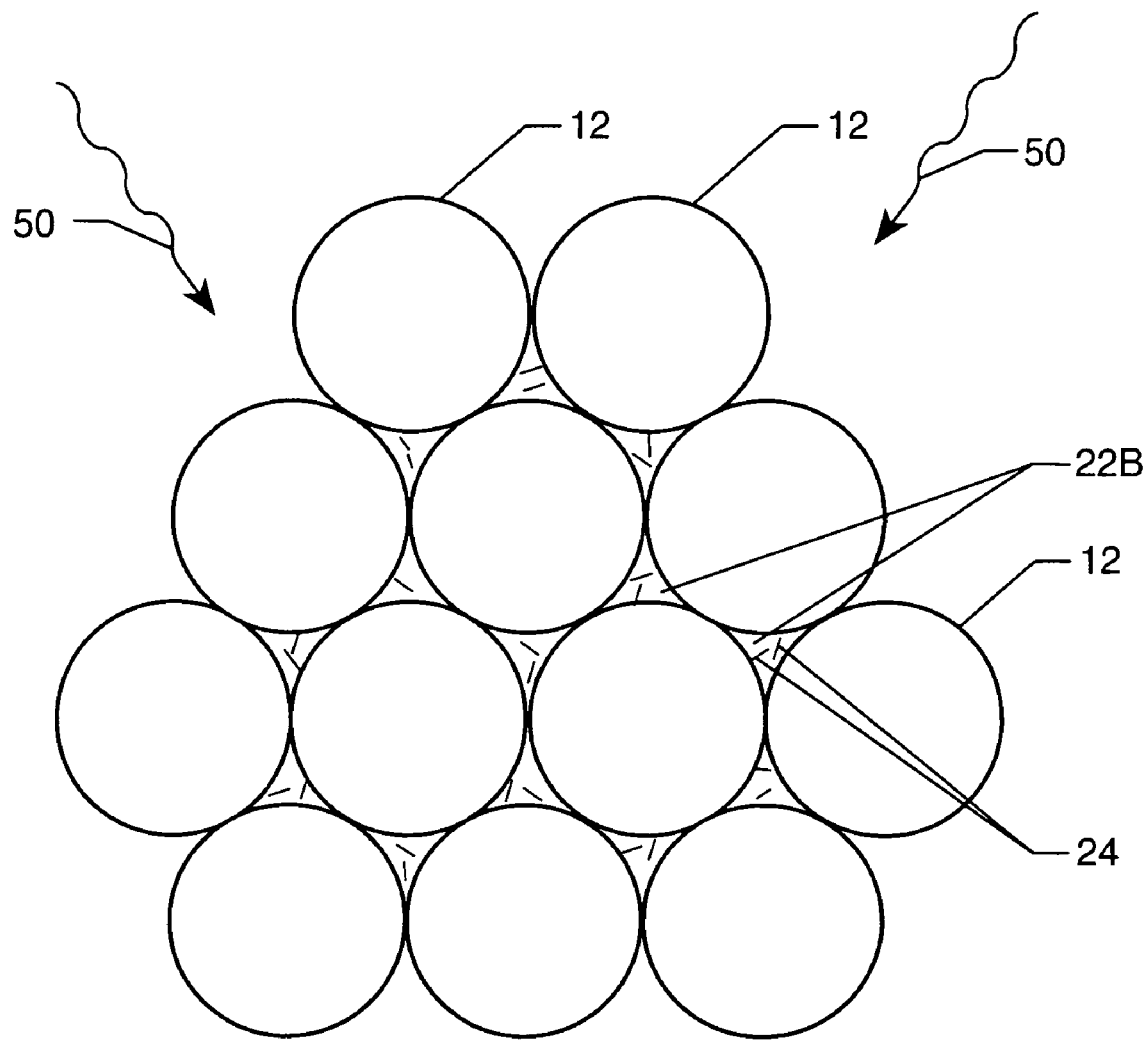
Figure 1F:
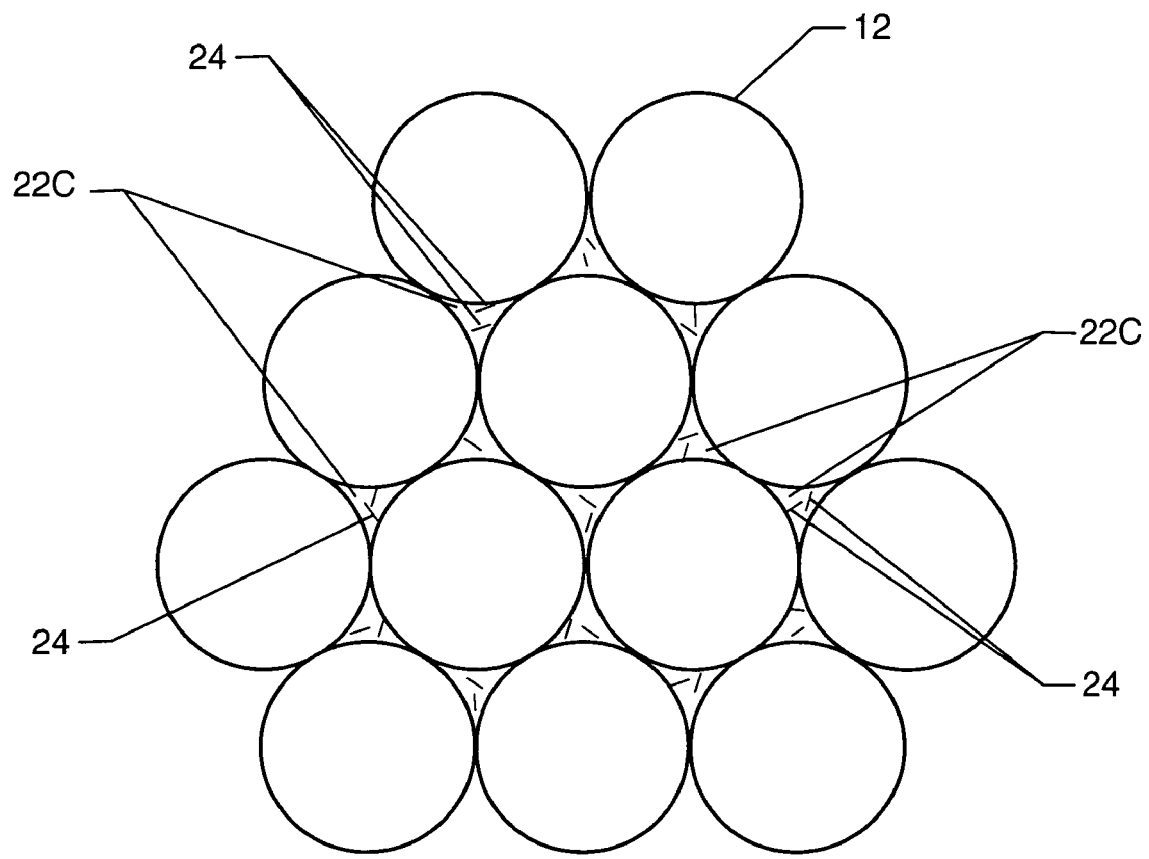
Figure 1G:
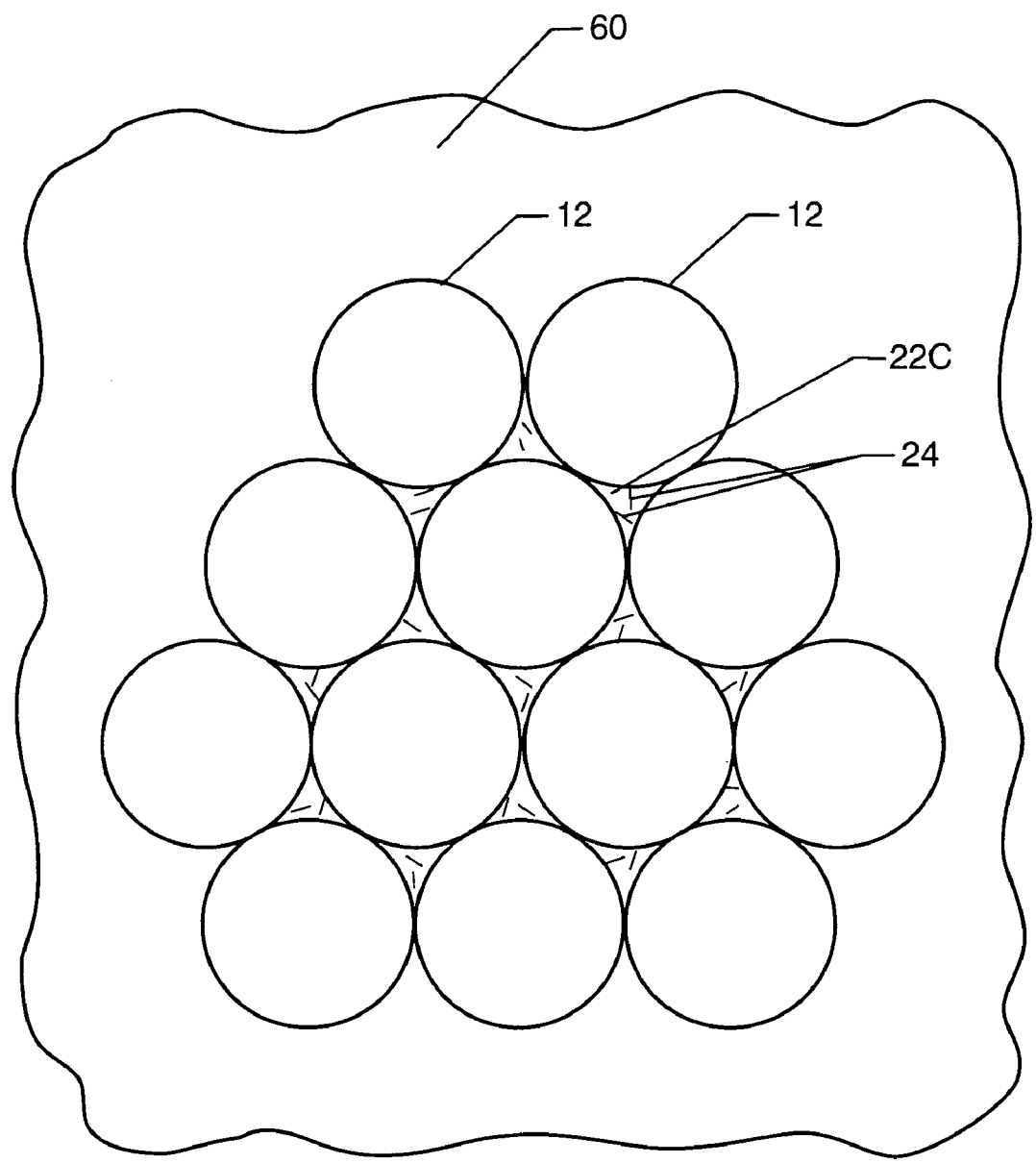

The material resulting from the curing process shown in FIG. 1D then undergoes a carbonization process which typically involves application of high heat, as represented by wavy arrows 50 in FIG. 1E. Such carbonization procedures are well known in the art. Carbonization causes a known percentage of carbon yield material 22B to be converted to solid carbon 22C, which is illustrated in FIG. 1F. Since CNTs 24 were dispersed in a solid form of the carbon yield material prior to carbonization thereof, CNTs 24 are and remain dispersed in solid carbon 22C.

Figure 1H:
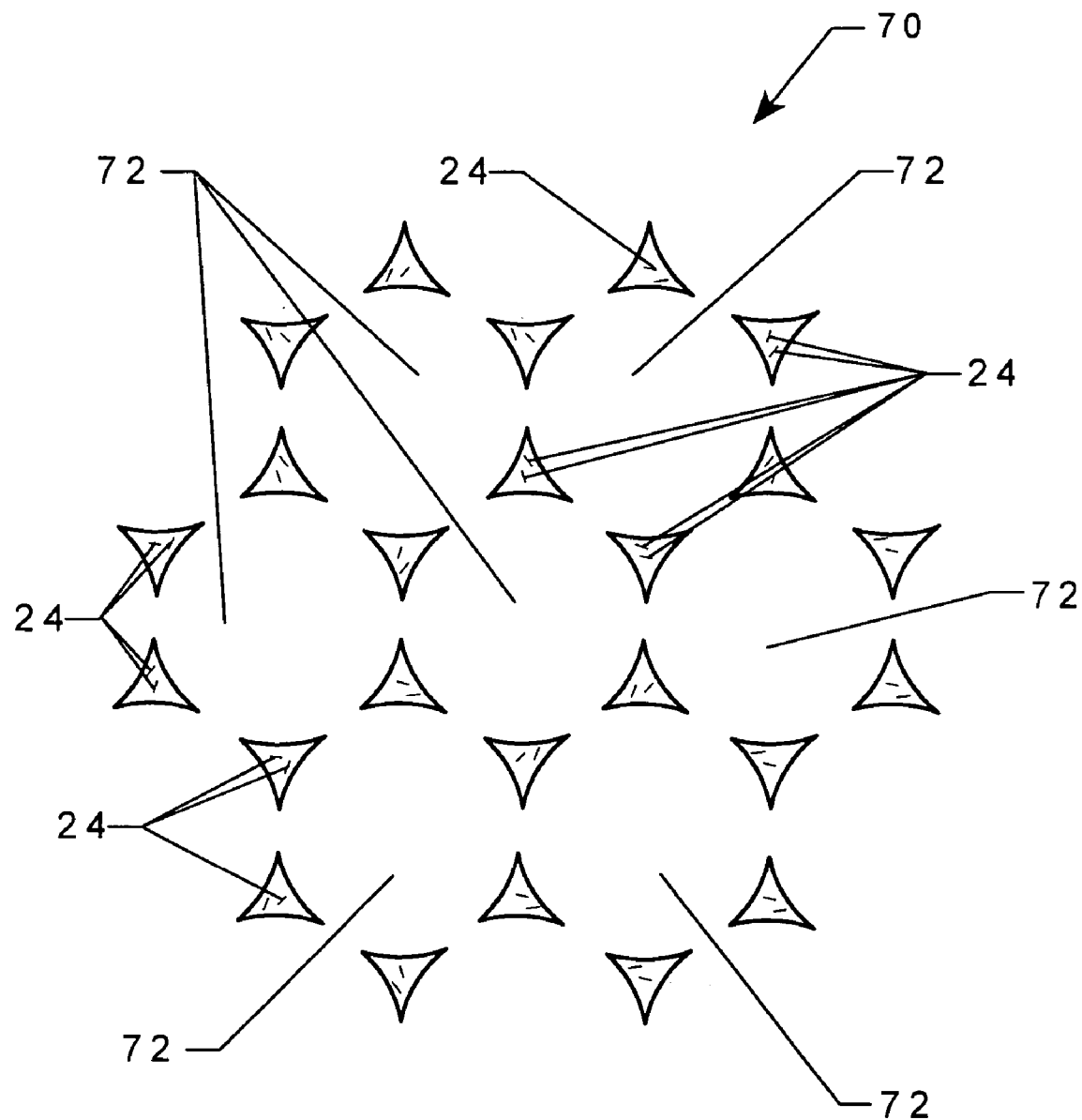

The final processing step of the present invention involves eliminating or eradicating spheres 12 from the structure illustrated in FIG. 1F. This can be achieved by chemically dissolving spheres 12. For example, the structure from FIG. 1F can be immersed in a bath 60 (FIG. 1G) of a liquid that dissolves spheres 12 (e.g., a bath of hydrofluoric acid or potassium hydroxide if spheres 12 are silicon dioxide spheres). The resulting porous carbon 70 to include CNTs 24 dispersed therein having uniformly sized and distributed pores 72 is illustrated in FIG. 1H. Fluid communication between adjacent pores 72 is provided for by necking connections 14 (FIG. 1A) between (now eradicated) spheres 12.

An example of the present invention will now be described where the carbon yield material is a polyimide, the solvent is dymethylformamide (DMF), the CNTs are single-wall CNTs, and the silicon dioxide template is made from approximately 200 nanometer diameter silicon dioxide spheres packed into a face-centered-cubic opal-like lattice. A first pre-mixture of 37 weight percent polyimide/DMF (12 g polyimide in 20 g DMF) was prepared and mixed for several hours while being heated to 100° C. A second pre-mixture of 0.5 weight percent CNT/DMF (0.02 g CNTs in 3.98 g DMF) was prepared and mixed for several hours while being heated to 100° C. in a bath that also had ultrasonic energy coupled thereto to keep the CNTs dispersed therein. To form the resulting liquified mixture, approximately half of the first pre-mixture was mixed into and with the second pre-mixture in an open container for 30 minutes.

A 1 cm$^2$ piece of the silicon dioxide template (1-2 mm thick) and stir bar were added to the container containing the above-described liquefied mixture. A condenser was connected to the open side of the container. The container was placed on a heating element. The liquefied mixture was stirred while the DMF was refluxed for 6-8 hours at 200-215° C. Simultaneously, ultrasonic energy was applied such that the liquefied mixture would be subjected thereto. As a result, the silicon dioxide template became infiltrated with the liquefied mixture.

After infiltration, the stir bar was removed from the container and the remaining contents of the container was poured into a TEFLON-coated aluminum foil box. The box was then placed in a vacuum oven at 200° C. for 3-4 hours while a vacuum pump was used to draw out the evaporating DMF. After most of the DMF solvent was evaporated, the temperature was increased to 250° C. and the vacuum pressure was slowly raised to 30 inches Hg. These conditions were maintained for several hours.

Next, while maintaining the vacuum, heat was removed and the sample was cooled to 50° C. before removing the vacuum. After removing the sample from the vacuum oven, the sample was placed in a curing oven. The curing program consisted of a temperature increase from room temperature to 250° C. at 1° C. per minute, a 1 hour hold at 250° C., a temperature increase from 250-350° C. at 1° C. per minute, a 1 hour hold at 350° C., and an uncontrolled cooling to room temperature.

After the sample cooled to room temperature, it was prepared for carbonization. The sample was removed from the aluminum foil box and excess polyimide/CNT material was removed from around the template using one or more of sanders, saws, hand sanding, etc. For carbonization, the sample was placed in a ceramic tray that was then placed inside a tube furnace. The sample was heated at a rate of 2° C. per minute to 871° C., held at 871° C. for 4 hours, and then cooled to room temperature at a rate of 2° C. per minute. The carbonization was done in a nitrogen atmosphere.

Finally, the original silicon dioxide opal-like material was removed by soaking the sample in a 25 weight percent hydrofluoric acid bath for 7 days. After the silicon dioxide template was removed, the resulting sample was soaked and rinsed in water before drying same at 100° C. for 2-3 hours. As would be understood by one skilled in the art, the temperatures and times used for infitration, solidification and curing in the present invention can be varied to accomodate the requirements of a particular carbon yield material.

The advantages of the present invention are numerous. A three-dimensionally ordered porous carbon structure has excellent mechanical strength owing to the inclusion of CNTs. For example, samples made in accordance with the present invention yielded compression test results that were 4-10 times better than porous carbon having no CNT reinforcement. Dynamic infiltration assures that the CNTs remain dispersed throughout the fabrication process so that mechanical and/or electrical properties will be uniform throughout the porous carbon structure. The resulting porous carbon structure can be used in a variety of applications to include energy storage, fuel cell technologies, electrochemical devices, thermal dispersion devices, and electrical charge dispersion devices.

Although the invention has been described relative to a specific embodiment thereof, there are numerous variations and modifications that will be readily apparent to those skilled in the art in light of the above teachings. It is therefore to be understood that, within the scope of the appended claims, the invention may be practiced other than as specifically described.

What is claimed as new and desired to be secured by Letters Patent of the United States is:

1. A three-dimensional structure comprising solid carbon having carbon nanotubes (CNTs) dispersed therein, said solid carbon with said CNTs dispersed therein being formed about three-dimensionally ordered spherical voids arranged in an opal-like lattice, said solid carbon being generated by carbonization of a carbon yield material having said CNTs dispersed therein.

2. A three-dimensional structure as in claim 1, wherein each of said spherical voids is uniformly sized.

3. A three-dimensional structure as in claim 1, wherein each of said spherical voids is generated by dissolution of a silicon dioxide sphere.

4. A three-dimensional structure as in claim 3, wherein each said silicon dioxide sphere is approximately the same size.

5. A three-dimensional structure as in claim 1, wherein said spherical voids are linked in said opal-like lattice wherein said three-dimensional structure is porous.

6. A three-dimensional structure as in claim 1, wherein said carbon yield material comprises a polymer.

7. A three-dimensional structure comprising solid carbon having carbon nanotubes (CNTs) dispersed therein, said solid carbon with said CNTs dispersed therein being formed about three-dimensionally ordered spherical voids with each of said spherical voids in communication with others of said spherical voids adjacent thereto, said solid carbon generated by carbonization of a carbon yield material having said CNTs dispersed therein.

8. A three-dimensional structure as in claim 7, wherein each of said spherical voids is uniformly sized.

9. A three-dimensional structure as in claim 7, wherein each of said spherical voids is generated by dissolution of a silicon dioxide sphere.

10. A three-dimensional structure as in claim 9, wherein each said silicon dioxide sphere is approximately the same size.

11. A three-dimensional structure as in claim 7, wherein said carbon yield material comprises a polymer.

* * * * *